April 18, 1967  L. W. LERCH ETAL  3,314,376
TROLLEY CONVEYOR SYSTEM
Filed Dec. 14, 1964  2 Sheets-Sheet 1
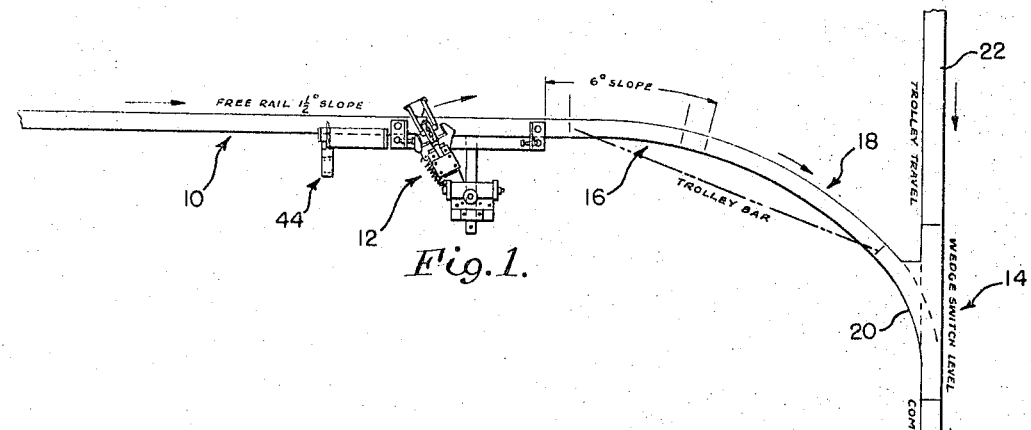
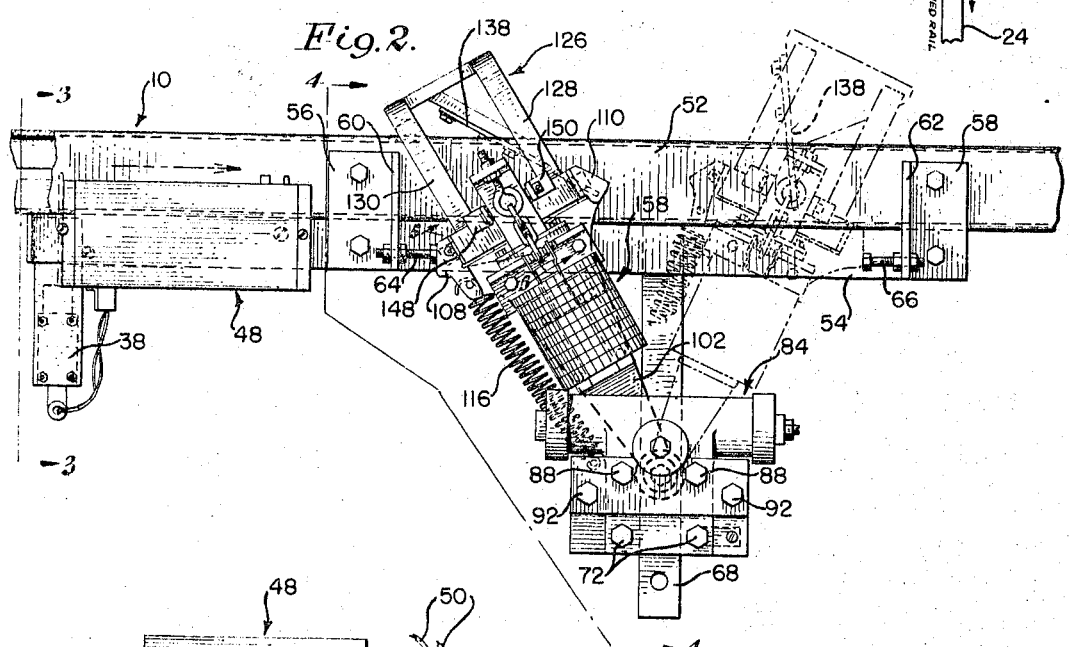
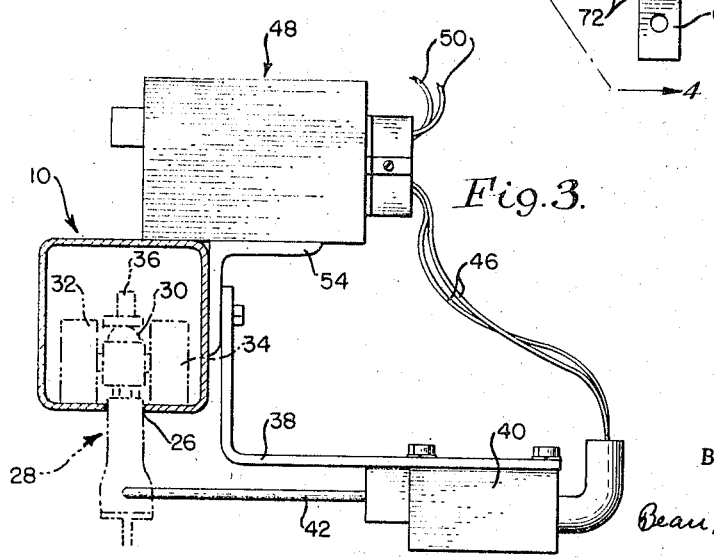
INVENTORS
LOREN W. LERCH
AND
JEROME T. MORROW
BY
Bean, Brooks, Buckley & Bean
ATTORNEYS

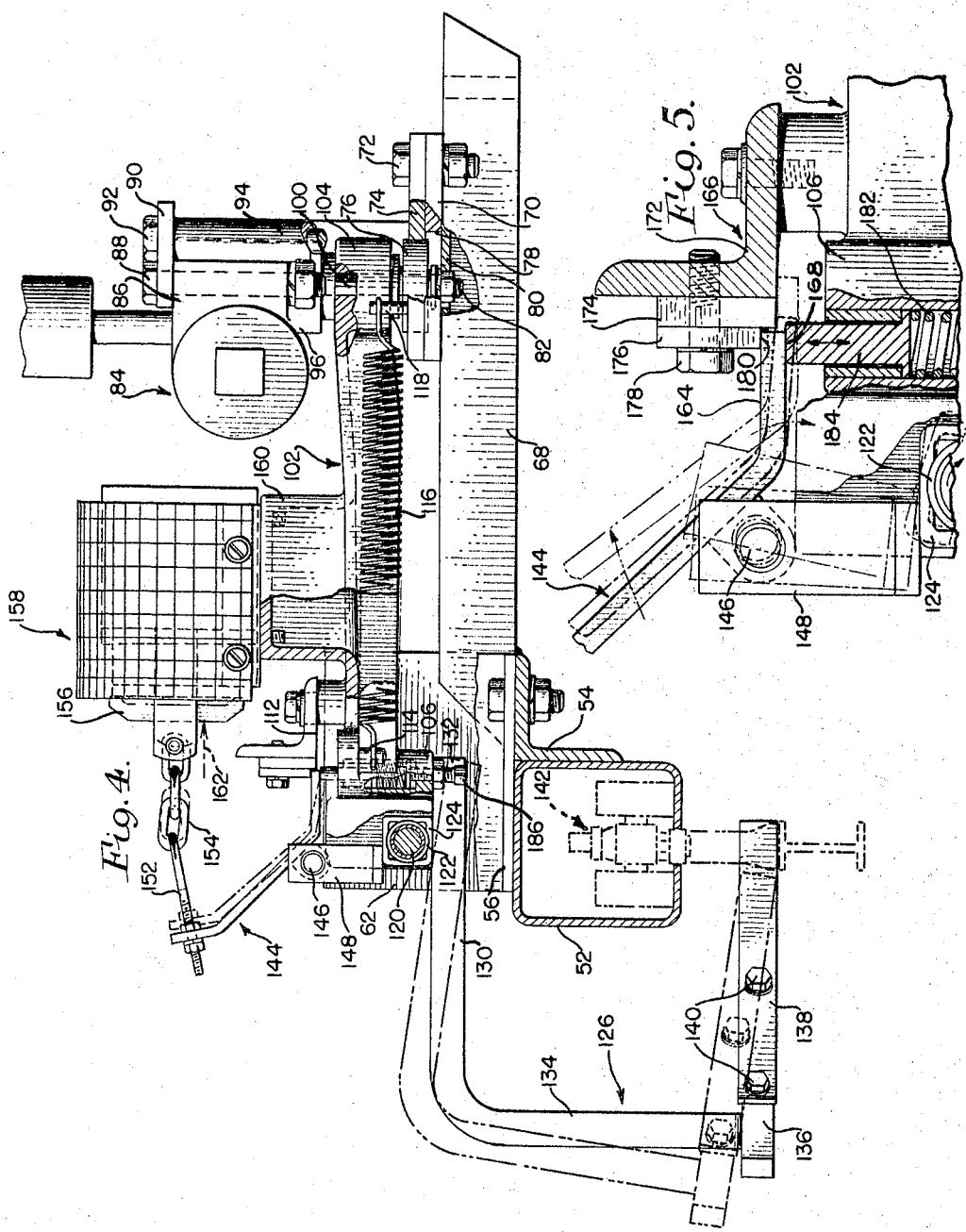

United States Patent Office 3,314,376
Patented Apr. 18, 1967

3,314,376
TROLLEY CONVEYOR SYSTEM
Loren W. Lerch, 124 Wakefield Ave., and Jerome T. Morrow, 345 Le Roy Ave., both of Buffalo, N.Y. 14214
Filed Dec. 14, 1964, Ser. No. 418,193
6 Claims. (Cl. 104—94)

This invention relates to load carrier systems and pertains, more particularly, to a "free running" portion of such a system and to mechanism for slowing down, stopping and then releasing, for further travel at reduced speed, load carriers which are free running on an inclined section of conveyor rail.

In overhead trolley conveyor systems, the trolleys are frequently routed to their ultimate destination at accumulation points and are thereafter returned to the powered portion of the system in free running condition, i.e. by gravity feed down inclined rail sections. Such inclined sections may lead to stations whereat the free running trolleys are integrated back into the powered driven portion of the system through suitable switching means which will orient the free running trolleys to be picked up by the overhead power conveyor mechanism. Obviously, such a system will require some mechanism to assure that the free running trolleys do not arrive at the integrating station at such velocity as to establish the likelihood of damage or destruction of the component parts of the system. Accordingly, it is an object of the present invention to provide, in a system as aforesaid, means whereby free running trolleys are intercepted, gradually slowed down and brought to a stop, and then released for travel at a reduced rate of speed to a station such as set forth hereinabove.

It is a further object of this invention to provide a mechanism of the character described hereinabove which is so arranged in its cooperation between elements as to minimize the number of component parts while yet achieving a fully efficient and effective mode of operation.

Another object of this invention is to provide an arresting and releasing mechanism for free running trolleys in which the swinging movement of a mounting arm is utilized, in conjunction with shock absorbing mechanism, to gently and gradually arrest the motion of a traveling, free running trolley; and in which a yoke assembly is mounted for movement with the arm and for engagement by the free running trolley, the yoke assembly having means associated therewith for selectively releasing a trolley subsequent to its being stopped by the arresting mechanism.

Still another object of this invention resides in the provision of mechanism according to the preceding object wherein the arresting portion of the yoke assembly is so constructed and arranged as to provide a positive stopping mechanism for a free running trolley while, at the same time, the releasing operation is achieved simply and with a minimum of effort on the part of the actuating means therefor. Further, the mechanism is so constructed that the yoke assembly may not accidently be displaced from its arresting condition until the release mechanism is actuated.

Other objects and advantages of the invention will appear from the description hereinbelow and the accompanying drawing wherein:

FIG. 1 is a plan view showing a portion of a conveyor system and illustrating the relationship of the present invention therewithin;

FIG. 2 is a enlarged plan view showing a section of free running trolley rail and showing the retarding mechanism of the present invention in full and dash-dot lines therein;

FIG. 3 is a vertical section taken substantially along the plane of section line 3—3 in FIG. 2 illustrating the placement of the sensing switch;

FIG. 4 is an enlarged vertical section taken substantially along the plane of section line 4—4 in FIG. 2 showing details of the retarder mechanism; and FIG. 5 is an enlarged sectional view illustrating the latching operation of the yoke assembly.

With reference now more particularly to FIG. 1, the free rail section indicated generally by the reference character 10 therein may be constructed in any conventional fashion to carry load trolleys in free running or gravity influenced condition therewithin, the free rail section having the desired predetermined slope, as for example of the order indicated in the figure, and the particular rail section shown may be fed from one or a plurality of accumulation points to which loaded trolleys have been transported and routed by the power conveying portion of the system. The mechanism of the present invention is indicated generally by the reference character 12 in FIG. 1 and its purpose, as has been stated, is to gradually slow down and stop the free running trolleys, and then release them for controlled, reduced speed movement for intersection, as at 14, with the power portion of the system. For this purpose, the rail section 16 immediately downstream of the stopping mechanism 12 may be of a length and predetermined slope to impart the desired reduced and controlled speed of travel to the trolleys when released whereafter the trolleys travel along the level track section 18 for ultimate intersection, through the medium of a suitable switch mechanism 20 for integration or combination with the overhead powered conveyor mechanism normally guided within and moving along the power rail section 22. Downstream of the switch device 20 is a combined rail section 24, i.e. the combined rail is composite, having an upper portion guiding the power transmitting mechanism and a lower portion guiding the trolleys as influenced by the powered mechanism.

The mechanism according to this invention includes a carrying or mounting arm swingably mounted and carrying a yoke assembly which is selectively disposed into the path of movement of a free running trolley and is subsequently moved out of such path to release the trolley after having been stopped by the assembly to permit the stopped trolley to enter the track section 16 shown in FIG. 1. The movement of the yoke assembly is controlled by a solenoid device, the yoke assembly acting under the influence of gravity, subsequent to deenergization of the solenoid device, to move into the position in which it is in the path of motion of a free running trolley. Thus, the yoke assembly is normally out of such position, i.e. in the trolley releasing position, and a timing device is utilized to selectively deenergize the solenoid actuator for a predetermined period of time sufficient to permit the stopping of a free running trolley so that at the end of the timed period, the stopped trolley will be released.

With reference now to FIG. 3, the free running rail section 10 as shown therein will be seen to be of essentially boxed section form having an opening or slot 26 through which the depending load carrying portion 28 of a trolley projects. The body proper of the trolley is indicated by the reference character 30 and such body carries wheels 32 and 34, as is conventional, for supporting and guiding the trolley assembly within the rail component. The trolley may also be conventionally provided with a dog member 36 upstanding therefrom which is to be engaged by the power portion of the conveyor assembly, as for example in the combined rail section 24 whereby the trolley is pushed along and powered by such power conveying mechanism. Such construction is old and well known in the art and does not, per se, form part of the present invention.

FIG. 3 illustrates the switch and timer mechanism as above described in general. For this purpose, the rail section 10 will be seen to be provided with the mounting bracket 38 which supports a switch device 40 having a movable arm 42 extending therefrom in underlying relationship to the trolley rail and in the path of movement, normally, of a free running trolley extending down the section 10. The location of the switch mechanism is indicated by the reference character 44 in FIG. 1 and will be seen to upstream from the retarding and releasing mechanism 12 as shown therein. The action is that a trolley approaching the mechanism 12 will first trip the switch 40 which is connected, by suitable electrical leads 46, to a timing device indicated generally by the reference character 48. Normally the leads 50 extending from the timing device are electrically energized for energizing the solenoid actuator mentioned hereinabove and when the switch 40 is tripped, as by deflection of its arm 42, the timer device 48 will deenergize the leads 50 for a predetermined length of time, thus deenergizing the solenoid actuator of the retarding and releasing mechanism. The switch 40 and the timer 48 are entirely conventional in construction and are well known articles of commerce and the details thereof, per se, do not form any part of the present invention although their utilization in combination with mechanism hereinafter described does come within the purview and ambit of the present invention.

Referring now to FIGS. 2 and 4, the section 52 of the rail within which the retarding and releasing mechanism operates will be seen to be provided with a mounting bracket which may take the form of an elongate section of angle iron 54 provided with stop brackets 56 and 58 at its opposite ends, suitably rigidly fastened to the rail 52 so that the angle iron 54 and the two brackets 56 and 58 are rigidly affixed thereto. Each of the brackets 56 and 58 is of L-shaped configuration, each being provided with a transversely extending and upstanding leg portion 60, 62 which mount suitable abutment stop elements such as the adjustable screwthread fastening elements 64 and 66.

Projecting laterally from the rail 52 substantially midway between the stop brackets 56 and 58 is a generally horizontal frame member 68 which is rigidly affixed at its inner end to the angle iron bracket member 54. This frame member 68 may be of inverted channel section or any suitable form to impart sufficient rigidity to withstand the loads imposed thereon. A plate member 70 is rigidly affixed to the upper side of the frame member 68, preferably by welding, and removably secured on this plate 70 as by means of suitable fasteners 72 is a base plate member 74 which mounts a bearing device 76, preferably of the roller or ball bearing type. The plate 70 is provided with an opening 78 clearing the bearing 76 and the web 80 of the channel frame member 68 is provided with an opening clearing the threaded lower end portion 82 of the operating shaft of the shock absorber assembly indicated generally by the reference character 84. The shock absorber 84 may be of any desired form but is preferably of the piston and cylinder type wherein the piston is moved internally of the cylinder by means of a cam rigid with the actuating shaft 82 and, further, it is preferred that the action of the shock absorber be unidirectional so that return motion of the shock absorber assembly is substantially free of any retarding action, as will hereinafter more particularly appear.

The shock absorber 84 includes a wing portion 86 having openings for receiving mounting bolts 88 therethrough and by means of which an anchor plate 90 is attached to the shock absorber body. The anchor plate 90 is in turn mounted to the plates 74 and 70 by means of through bolts 92 with there being spacing sleeves 94 intervening between the plate 90 and the plate 74. Thus, a rigid mount for the shock absorber assembly is provided. The shock absorber as shown in FIG. 4 also includes a boss portion 96 which rotatably receives the actuator shaft 82 thereof, it being appreciated that there is a lateral opening into the main body or cylinder of the shock absorber to clear the cam element carried by the actuator shaft 82 which operates the piston of the shock absorber assembly.

Attached to a spline or keyed portion 100 of the shock absorber actuating shaft 82 is an arm assembly indicated generally by the reference character 102. This mounting or carrying arm is provided with a hub portion 104 for establishing the keyed or otherwise feathered connection to the shaft portion 100 and the arm projects radially from the shaft as shown and is provided at its outer or free end with a depending body portion 106 disposed in the central region thereof with there being forwardly extending ears 108 and 110 at either end thereof, see particularly FIG. 2. The ear 108 has a rear corner extension 112 carrying a depending anchor pin member 114 to which one end of a tension spring 116 is secured, the opposite end of the tension spring being secured to a post or pin 118 mounted on the plate member 74. This spring serves to normally position the arm assembly in the position shown in full lines in FIG. 2.

Carried between the two ears 108 and 110 is a pivot shaft member 120 which, in the specific embodiment shown, is non-rotatably carried thereby and journalled thereon is an internally bushed sleeve 122 enveloped by and rigidly attached to a surrounding boxed sectioned tube 124. A yoke assembly indicated generally by the reference character 126 and which is of generally U-shaped configuration in elevational view is mounted on the tube 124. For this purpose, the upper leg of the yoke assembly 126, which is defined by the spaced elements 128 and 130 pass beneath the tube 124 and are rigidly affixed thereto as by welding or the like with the inner ends 132 of these members underlying the body portion 106 of the carrying arm so that this portion of the arm assembly forms an abutment or limit stop so that the yoke assembly 126 is normally urged under the action of gravity toward the full line position shown in FIG. 4. The end portions 134 of the members 128 and 130 form the bight of the yoke assembly and the lower leg is attached thereto, substantially as shown. The lower leg is formed by an element 136 rigidly affixed to the bight portions 134 and a strap element 138 is affixed to one edge thereof as by the fasteners 140. The length of the strap 138 is such that when the yoke assembly 126 is in the full line position shown in FIG. 4, the free end of the strap 138 is disposed in the path of movement of a free running trolley such as that indicated generally by the reference character 142 in FIG. 4.

For the purpose of moving the yoke assembly to the dash-dot line position shown in FIG. 4 wherein the leg or strap 138 is clear of the path of motion of the depending portion of the free running trolley 142, the lever assembly 144 is provided. This lever assembly is rotatably affixed to the remainder of the yoke assembly through the medium of the pivot mounting shaft 146 which is carried between a pair of brackets 148 and 150 rigidly affixed to the tube 124. The upper end of the lever 144 is provided with a suitable opening receiving an eyebolt member 152 which is flexibly connected, as by the chain links 154, to the armature 156 of the solenoid assembly indicated generally by the reference character 158. The solenoid assembly is suitably mounted upon a pedestal portion 160 of the carrying arm 102 and is adapted, when energized, to move its armature to the right as indicated by the dotted arrow 162 in FIG. 4 to effect certain mechanical motions as hereinafter more particularly described to ultimately dispose the yoke assembly in a dash-dot line position as shown in FIG. 4 wherein it clears the trolley 142.

With reference now more particularly to FIG. 5, it will be seen that the lower end of the lever 144 is bent to provide a substantially horizontal shoe 164 which is cooperable with a guide assembly indicated generally by the reference character 166. The guide assembly is formed between the upper surface 168 of the body 106 and the undersurface 170 of bracket 172 and rubbing block member 174 disposed in spaced relationship above such surface 168, to thereby provide and form the guide slot substantially as is shown. The bracket 172 is constructed of metal whereas the rubbing block member 174 is preferably constructed of nylon, Teflon, sintered bronze, or the like. In addition, there is an abutment block 176 secured, together with the rubbing block 174 to the bracket member 172 by means of suitable fasteners such as that indicated by reference character 178. It is to be noted that the block 176 forms a step as at 180 which is adapted to receive the free end of the shoe 164 therebeneath and prevent rotational movement of the yoke assembly, the step formation thereby forming a latch or lock for blocking movement of the yoke assembly to the out-of-the-way position. The purpose of this arrangement will be presently apparent. Mounted in the body 106 is a compression spring 182 and an associated plunger 184 which normally bears against the underside of the shoe 164 and assures that the same normally resides within the step 180 substantially as is shown in full lines in FIG. 5. Adjustment for the spring 182 and plunger 184 may be provided as by a screw-threaded element 186, see particularly FIG. 4. When the solenoid 158 is deenergized, and the yoke assembly consequently assumes its full line position shown in FIG. 4 and FIG. 5, the latching or locking assembly is operative, as will be apparent. Thus, whenever the solenoid 158 is deenergized, it will be impossible to accidently move the yoke assembly 126 to the out-of-the-way position. However, as soon as the solenoid 158 is energized, the lever 144 will initially rotate without imparting rotation to the yoke assembly until the plunger 184 has been depressed so as to permit the shoe 164 to enter the slot of the guide assembly. As soon as this occurs, the action of the solenoid 158 will pull the upper end of the lever towards the solenoid assembly and will consequently impart rotational movement to the yoke assembly about the axis of the pivot shaft 120.

The purpose of this latching arrangement will be appreciated from a study of FIG. 2. In this figure, it will be noted that the leg or strap 138 is angled substantially with respect to the axis of the rail 52 in the full line position of the retarding and releasing mechanism. The reason for this is that this leg must be angled sufficiently and in the initial position as aforesaid to permit at least a slight amount of angulation to result when the assembly is in the dotted line position also shown in FIG. 2. The reason for this, in turn, is to permit the yoke assembly to be moved to trolley releasing position without having to push the trolley backwards or in any way bodily move the same. In other words, the path of motion of the leg 138 as it moves to trolley releasing position is downstream, slightly relative to the trolley, and laterally away from the trolley to thereby release it smoothly, efficiently and without requiring an inordinate amount of force to be applied by the solenoid 158.

This angulation of the leg 138 will permit the trolley, when initially engaging the leg in the full line position shown in FIG. 2, to impart substantial lateral force on the yoke assembly tending to rotate the same to the out-of-the-way or trolley released position. This is effectively prevented by the latching assembly as hereinbefore defined.

It is to be understood that certain changes and modifications as illustrated and described may be made without departing from the spirit of the invention or the scope of the following claims.

We claim:

1. In combination with an inclined trolley rail for feeding free running trolleys to a station at which they may be coupled with a trolley conveyor device, means for gradually stopping and subsequently releasing such free running trolleys, said means comprising a mounting arm pivotally mounted at one end thereof to said trolley rail for movement parallel to the direction of trolley movement along said trolley rail, a yoke assembly pivotally mounted at the opposite end of said arm for movement in a vertical plane extending longitudinally of said arm and including a leg movable into and out of the path of movement of free running trolleys progressing along said trolley rail toward the aforementioned station, disabling means for swinging said yoke assembly about its pivot to move said leg out of the path of movement of free running trolleys, return means for indexing said arm to a first position thereof, and energy absorbing means for resisting movement of said arm to a second position as may be effected by engagement of a free running trolley with said leg.

2. In an overhead trolley conveyor system, in combination, an inclined trolley rail leading to a station at which free running trolleys may be coordinated with a conveyor mechanism therefor, a generally horizontal arm pivotally mounted adjacent said trolley rail about a vertical pivot axis, a yoke assembly pivotally mounted adjacent a free end of said arm about a generally horizontal pivot axis, said yoke assembly including a generally horizontal leg underlying said trolley rail, release means mounted on said arm and connected to said yoke assembly for rocking the latter about its pivot axis to move said leg from a position intercepting a free running trolley to a position displaced laterally thereof and clearing a free running trolley.

energy absorbing means connected to said arm for resisting pivotal motion thereof as imparted thereto by impingement of a free running trolley against said leg and including mechanism for returning said arm to a normal position thereof.

3. In combination with an inclined trolley rail for feeding free running trolleys to a station at which they may be coupled with a trolley conveyor device.

means for gradually stopping and subsequently releasing such free running trolleys, said means comprising a mounting arm pivotally mounted at one end thereof to said trolley rail for movement parallel to the direction of trolley movement along said trolley rail, a yoke assembly pivotally mounted at the opposite end of said arm for movement in a vertical plane extending longitudinally of said arm and including a leg movable into and out of the path of movement of free running trolleys progressing along said trolley rail toward the aforementioned station, disabling means for swinging said yoke assembly about its pivot to move said leg out of the path of movement of free running trolleys, return means for indexing said arm to a first position thereof, and energy absorbing means for resisting movement of said arm to a second position as may be effected by engagement of a free running trolley with said leg, latch means for locking said yoke assembly in trolley-intercepting position, said disabling means being connected to said latch means for releasing the same upon energization of the disabling means.

4. In an overhead trolley conveyor system, in combination, an inclined trolley rail leading to a station at which free running trolleys may be coordinated with a conveyor mechanism therefor, a generally horizontal arm pivotally mounted adjacent said trolley rail about a vertical pivot axis, a yoke assembly pivotally mounted adjacent a free end of said arm about a generally horizontal pivot axis, said yoke assembly including a generally horizontal leg underlying said trolley rail, release means mounted on said arm and connected to said yoke assembly for rocking the latter about its pivot axis to move said leg from a position intercepting a free running trolley to a position displaced laterally thereof and clearing a free running trolley, energy absorbing means connected to said arm for resisting pivotal motion thereof as imparted thereto by impingement of a free running trolley against said leg and including mechanism for returning said arm to a normal position thereof, latch means for locking said yoke assembly in trolley-intercepting position, said disabling means being connected to said latch means for releasing the same upon energization of the disabling means.

5. In a conveyor system, in combination, an inclined trolley rail section, an arm pivotally mounted adjacent one end about a substantially vertical pivot axis and having its opposite end overlying said trolley rail, means for resisting swinging movement of said arm in the downhill direction of said trolley rail and including mechanism for returning said arm to a predetermined uphill position relative to said trolley rail, a generally U-shaped yoke assembly, said yoke assembly being disposed substantially vertically to define upper and lower generally horizontal legs interconnected by a bight portion, the free end of said upper leg being pivotally connected to said opposite end of said arm about a generally horizontal axis extending transversely of such leg, and the free end of said lower legs underlying said trolley rail, a control lever for said yoke assembly, said control member being pivotally connected between its ends to said upper leg, one end of said lever presenting a shoe, actuator means mounted on said arm and connected to the other end of said lever for rocking said yoke assembly about its pivot axis to shift said free end of the lower leg laterally relative to said trolley rail, guide means on said arm receiving said shoe.

6. In a conveyor system, in combination, an inclined trolley rail section, an arm pivotally mounted adjacent one end about a substantially vertical pivot axis and having its opposite end overlying said trolley rail, means for resisting swinging movement of said arm in the downhill direction of said trolley rail and including mechanism for returning said arm to a predetermined uphill position relative to said trolley rail, a generally U-shaped yoke assembly, said yoke assembly being disposed substantially vertically to define upper and lower generally horizontal legs interconnected by a bight portion, the free end of said upper leg being pivotally connected to said opposite end of said arm about a generally horizontal axis extending transversely of such leg, and the free end of said lower legs underlying said trolley rail, a control lever for said yoke assembly, said control member being pivotally connected between its ends to said upper leg, one end of said lever presenting a shoe, actuator means mounted on said arm and connected to the other end of said lever for rocking said yoke assembly about its pivot axis to shift said free end of the lower leg laterally relative to said trolley rail, guide means on said arm receiving said shoe, said guide means including a step portion forming a latch abutment for precluding pivotal motion of said yoke assembly.

No references cited.

ARTHUR L. LA POINT, *Primary Examiner.*

J. E. BABER, *Assistant Examiner.*